United States Patent
Cao et al.

(10) Patent No.: US 12,199,309 B2
(45) Date of Patent: Jan. 14, 2025

(54) BATTERY CLUSTER AND ENERGY STORAGE SYSTEM

(71) Applicant: Sungrow Power Supply Co., Ltd., Hefei (CN)

(72) Inventors: Wei Cao, Anhui (CN); Ri Fang, Anhui (CN); Jianjie Zhou, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/534,565

(22) Filed: Nov. 24, 2021

(65) Prior Publication Data

US 2022/0190446 A1 Jun. 16, 2022

(30) Foreign Application Priority Data

Dec. 16, 2020 (CN) .......................... 202011487622.3

(51) Int. Cl.
*H01M 50/51* (2021.01)
*H01M 10/42* (2006.01)
*H01M 10/46* (2006.01)
*H01M 50/204* (2021.01)

(52) U.S. Cl.
CPC ....... *H01M 50/51* (2021.01); *H01M 10/4207* (2013.01); *H01M 10/46* (2013.01); *H01M 50/204* (2021.01)

(58) Field of Classification Search
CPC ............... H01M 50/51; H01M 50/204; H01M 10/4207; H01M 10/46
See application file for complete search history.

(56) References Cited

U.S. PATENT DOCUMENTS

| 2005/0174092 A1* | 8/2005 | Dougherty | H01M 50/51 |
| | | | 320/128 |
| 2009/0308427 A1 | 12/2009 | Baba | |
| 2013/0108905 A1 | 5/2013 | Murakami et al. | |

(Continued)

FOREIGN PATENT DOCUMENTS

| CN | 106233526 A | 12/2016 |
| CN | 207320200 U | 5/2018 |

(Continued)

OTHER PUBLICATIONS

First Office Action for Chinese Application No. 202011487622.3, dated Jul. 28, 2022.

(Continued)

*Primary Examiner* — Olatunji A Godo
(74) *Attorney, Agent, or Firm* — Wolf, Greenfield & Sacks, P.C.

(57) ABSTRACT

A battery cluster and an energy storage system are provided. The battery cluster includes multiple battery modules, all of the multiple battery modules are arranged in even rows, and each battery module is connected in series with an adjacent battery module one by one, to form a ring connection. Such that the length of a cable connecting a positive electrode and a negative electrode of a battery cluster to a switch box is less than a preset value. In the present disclosure, each battery module in the battery cluster is connected in series with an adjacent battery module one by one, such that a ring connection is formed, thereby reducing the cost of connecting cables and the total cost of the energy storage system.

14 Claims, 7 Drawing Sheets

(56) References Cited

U.S. PATENT DOCUMENTS

| | | | |
|---|---|---|---|
| 2017/0125855 A1 | 5/2017 | Gong et al. | |
| 2018/0109016 A1 | 4/2018 | Fees et al. | |
| 2019/0356025 A1* | 11/2019 | Sung | B60L 58/22 |
| 2020/0274184 A1* | 8/2020 | Eichhorn | H01M 50/522 |
| 2021/0111568 A1* | 4/2021 | Cho | H01M 50/572 |
| 2022/0094179 A1* | 3/2022 | Tuomola | H01M 10/4207 |

FOREIGN PATENT DOCUMENTS

| | | |
|---|---|---|
| CN | 110336311 A | 10/2019 |
| EP | 2 587 565 A1 | 5/2013 |
| JP | 2013-120695 A | 6/2013 |
| JP | 2015-005605 A | 1/2015 |

OTHER PUBLICATIONS

Extended European Search Report for European Application No. 21209314.0, dated May 16, 2022.

\* cited by examiner

BATTERY CLUSTER AND ENERGY STORAGE SYSTEM

The present application claims priority to Chinese Patent Application No. 202011487622.3, titled "BATTERY CLUSTER AND ENERGY STORAGE SYSTEM", filed on Dec. 16, 2020 with the China National Intellectual Property Administration, which is incorporated herein by reference in its entirety.

FIELD

The present disclosure relates to the technical field of power supply, and in particular to a battery cluster and an energy storage system.

BACKGROUND

Reference is made to FIG. 1, which is a structural schematic diagram of an energy storage system in the conventional technology. The energy storage system includes n battery clusters (which are illustrated as 1#battery cluster, 2#battery cluster . . . n#battery cluster in FIG. 1, and n is an integer number greater than or equal to 1). Each of the n battery clusters includes a switch box and multiple battery modules, and the multiple battery modules are sequentially connected in series from bottom to top, and then are connected to the switch box. All battery clusters in the energy storage system are connected to a battery combiner cabinet, and then output from the combiner cabinet.

In the energy storage system shown in FIG. 1, the multiple battery modules in each battery cluster are sequentially connected in series from bottom to top and finally connected to the switch box. As a result, a cable connecting a positive electrode of a battery module at a bottom layer of one battery cluster with a positive electrode of a switch box at a top layer of the battery cluster is long, thus the cost of the cable is high, and the total cost of the energy storage system is also high.

SUMMARY

A battery cluster and an energy storage system are provided, which changes arrangement of battery modules in the battery cluster, to shorten the total length of connecting cables in the battery cluster and reduce the cost of the connecting cables and the total cost of the energy storage system.

To achieve the above objective, following technical solutions are provided.

A battery cluster, including multiple battery modules, where all of the multiple battery modules are arranged in even rows, each of the multiple battery modules is connected in series with an adjacent battery module one by one, to form a ring connection, such that the length of a cable connecting a positive electrode and a negative electrode of a battery cluster obtained by connecting all of the multiple battery modules in series to a switch box is less than a preset value.

In an example, each two adjacent rows of battery modules are defined as one battery sub-cluster, and the battery cluster is divided into at least one battery sub-cluster; and battery modules in each of the at least one battery sub-clusters are arranged in a matrix of 2 rows and N columns, where N is an integer number greater than or equal to one.

In an example, the battery sub-cluster includes at least one first type battery module and at least one second type battery module, a polarity of the first type battery module being opposite to a polarity of the second type battery module; battery modules in a same row in a battery sub-cluster are of a same type, and battery modules in a same column in the battery sub-cluster are of different types; after the battery modules in the same row in the battery sub-cluster are connected in series one by one, said battery modules in the same row are connected in series with battery modules in another row; and in a case that the number of battery sub-clusters is larger than one, the battery sub-clusters are connected in series one by one.

In an example, the first type battery module is arranged above the second type battery module.

In an example, the first type battery module is arranged under the second type battery module.

In an example, the battery cluster includes at least one first type battery sub-cluster and at least one second battery sub-cluster; in the first type battery sub-cluster, the first type battery module is arranged above the second type battery module; and in the second type battery sub-cluster, the first type battery module is arranged under the second type battery module.

In an example, the battery cluster includes at least one first type battery sub-cluster or at least one second battery sub-cluster; in the first type battery sub-cluster, the first type battery module is arranged above the second type battery module; and in the second type battery sub-cluster, the first type battery module is arranged under the second type battery module.

In an example, the multiple battery modules are arranged in any of the following ways:
horizontal arrangement, longitudinal arrangement and oblique arrangement at a preset angle.

In an example, in a case that the number of battery sub-clusters is larger than one, the number of battery modules in each battery sub-cluster is the same.

In an example, the battery cluster further includes a junction box, where in a case that the number of battery sub-clusters is larger than one, after the battery sub-clusters are connected in series one by one, the battery sub-clusters are connected to the junction box; and the battery sub-clusters are arranged in one column, and two ends of each of the battery sub-clusters are arranged on one side of the junction box.

An energy storage system, including a convergence device and at least one aforementioned battery cluster; where each battery cluster is connected with the convergence device respectively, and the convergence device is connected with a lower-level equipment.

In an example, the at least one battery cluster is arranged on one side of the convergence device.

In an example, in a case that the number of battery clusters is larger than one, said battery clusters are arranged on two sides of the convergence device.

In an example, each battery cluster further includes a switch box, the convergence device includes a battery convergence cabinet, and switch boxes of each battery cluster are respectively connected with the battery convergence cabinet.

In an example, the convergence device further includes at least one switch box and a battery convergence cabinet, the at least one battery cluster is connected with a corresponding switch box respectively, the corresponding switch box is connected with the battery convergence cabinet, and the battery convergence cabinet is connected with a lower-level equipment.

In an example, the convergence device further includes a power converter integrated with a switch box function and a current convergence function.

In an example, the convergence device further includes a power converter integrated with switch box function and current convergence function.

The battery cluster according to examples of the present disclosure includes multiple battery modules, all of the multiple battery modules are arranged in even rows, and each of the multiple battery modules is connected in series with an adjacent battery module one by one, to form a ring connection. Such that the length of a cable connecting a positive electrode and a negative electrode of a battery cluster obtained by connecting the plurality of battery modules in series to a switch box is less than a preset value. Compared with the conventional technology, each battery module in the battery cluster provided by the present disclosure is connected in series with an adjacent battery module one by one, such that a ring connection is formed, a positive electrode and a negative electrode of the battery cluster after the series connection are close to a switch box, and the length of a cable connecting the positive electrode and the negative electrode of the battery cluster with the switch box is less than a preset value. The cable connecting the positive electrode of the battery module at the bottom layer of the battery cluster with the positive electrode of the switch box at the top layer of the battery cluster in the conventional technology is no longer unnecessary, thereby reducing the cost of connecting cables and the total cost of the energy storage system.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

A battery cluster, including multiple battery modules, where all the battery modules in the battery cluster are arranged in even-numbered rows. For example, all the battery modules may be arranged in 2 rows, 4 rows, 6 rows, or the like. The specific number of the battery modules and the specific number of rows are flexibly selected according to the design capacity of the battery cluster and the specific conditions of the site, which are not specifically limited by the present disclosure.

Each battery module in the battery cluster is connected in series with an adjacent battery module one by one, such that a ring connection is formed, a positive electrode and a negative electrode of the battery cluster after the series connection are close to a switch box, and the length of a cable connecting the positive electrode and the negative electrode of the battery cluster with the switch box is less than a preset value. The specific connection mode among the battery modules can be realized with reference to the conventional technology, which will not be described in detail herein.

In summary, compared with the conventional technology, each battery module in the battery cluster provided in the present disclosure is connected in series with an adjacent battery module one by one, such that a ring connection is formed, a positive electrode and a negative electrode of the battery cluster after the series connection are close to a switch box, and the length of a cable connecting the positive electrode and the negative electrode of the battery cluster with the switch box is less than a preset value. The cable connecting the positive electrode of the battery module at the bottom layer of the battery cluster with the positive electrode of the switch box at the top layer of the battery cluster in the conventional technology is no longer unnecessary, thereby reducing the cost of connecting cables and the total cost of the energy storage system.

The general principle of the arrangement of the battery modules of the battery cluster provided by the present disclosure is described in the above, a variety of implementations for realizing the above arrangement are provided hereinafter in combination with specific examples.

Figure 1:
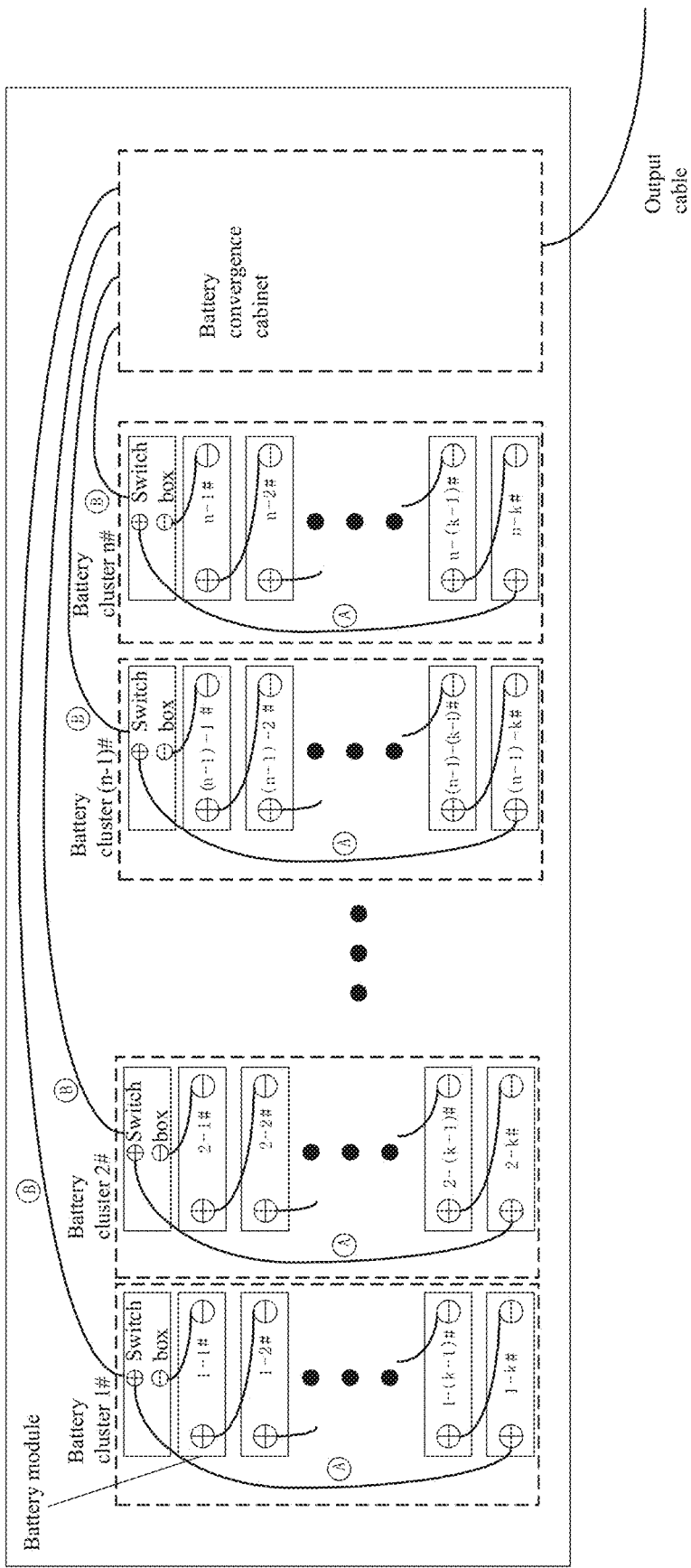
FIG. 1 is a structural schematic diagram of an energy storage system in the conventional technology.
Figure 2:
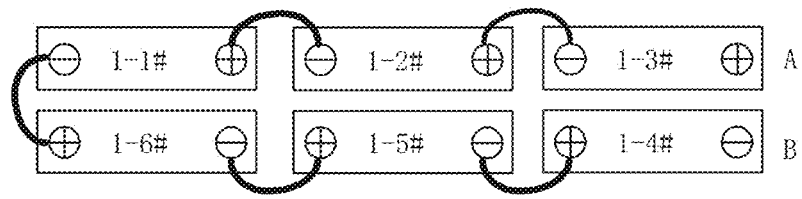
FIG. 2 is a structural schematic diagram of a battery cluster according to an example of the present disclosure.

Reference is made to FIG. 2, which is a structural schematic diagram of a battery cluster according to an example of the present disclosure. To realize the aforementioned ring connection, the battery cluster in this example includes two types of battery modules, referring to FIG. 2, battery module 1-1#, battery module 1-2#, and battery module 1-3# belong to a first type battery module; and battery module 1-4#, battery module 1-5#, and battery module 1-6# belong to a second type battery module. When facing an output port of a battery module and laying the battery module flat, a positive electrode of the first type battery module is on a person's right hand side, and a positive electrode of the second type battery module is on his left hand side. That is, the polarity of the first type of battery module and the second type of battery module are in opposite directions. The first type battery module and the second type battery module mentioned in the following are similar to the definitions and illustrations here, and will not be repeated hereinafter.

The battery cluster according to the example shown in FIG. 2 includes two rows of battery modules. Battery modules in a lower row are connected in series one by one, battery modules in an upper row are connected in series one by one, and a battery module at one end of the lower row is connected in series with an adjacent battery module that is at one end of the upper row, such that a ring connection is formed. Specifically, the battery module 1-4#is connected in series with the battery module 1-5#, the battery module 1-5#is connected in series with the battery module 1-6#, and the battery module 1-6#is connected in series with the battery module 1-1#in the upper row, and the battery module 1-1#is connected in series with the battery module 1-2#, and the battery module 1-2#is connected in series with the battery module 1-3#. A negative electrode of the battery module 1-4#is functioned as a negative electrode of the battery cluster (shown as B in FIG. 2), and a positive electrode of the battery module 1-3#is functioned as a positive electrode of the battery cluster (shown as A in FIG. 2).

In FIG. 2, each battery module is connected in series with an adjacent battery module one by one, and finally all battery modules are connected in a string, to form a ring connection. Thus the positive electrode and the negative electrode of the battery cluster are on the same side, reducing the length of a cable output from the battery cluster, and saving the cable and the cost.

When the number of battery modules in one battery cluster is large, the battery cluster may be divided into at least one battery sub-cluster, and every two adjacent rows of battery modules as a whole are called one battery sub-cluster. Accordingly, the battery cluster according to the example shown in FIG. 2 may be called one battery cluster or one battery sub-cluster.

Figure 3:
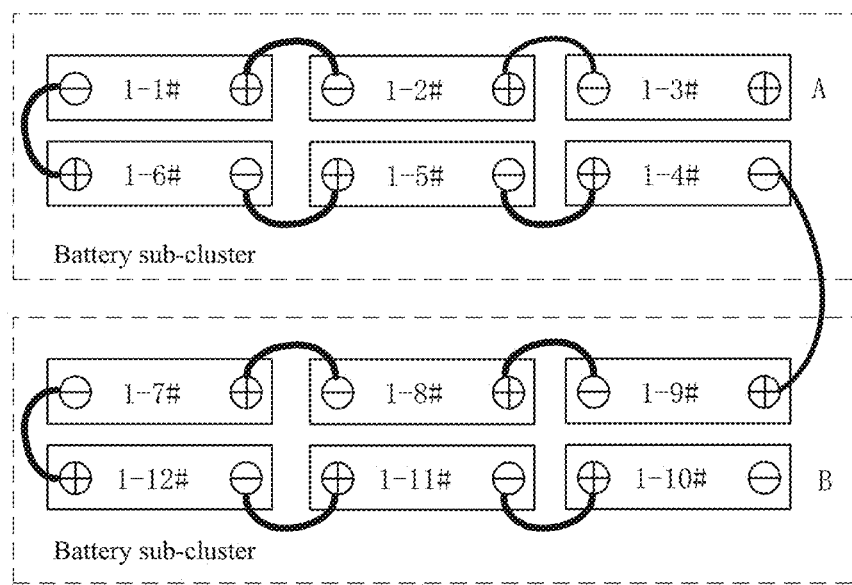
FIG. 3 is a structural schematic diagram of a battery cluster according to an example of the present disclosure.

Referring to FIG. 3, a battery cluster according to the example shown in FIG. 3 includes four rows of battery modules. The battery cluster is divided into two battery sub-clusters according to the above division principle. To save cables and optimize the arrangement of battery modules, battery modules in each battery sub-cluster are arranged in a matrix of 2 rows and N columns, where N≥1. And the value of N is determined by the number of battery modules in a row in a battery sub-cluster, and the number of battery modules in this row is the largest in the battery sub-cluster. For example, in one battery sub-cluster, one row of battery module includes 6 battery modules, the other row includes 8 battery modules, thus N is equal to 8, and the battery sub-cluster is arranged in a matrix of 2 rows and 8 columns.

When dividing the battery cluster into multiple battery sub-clusters, battery modules included in different battery sub-clusters are different, and one battery module cannot belong to different battery sub-clusters.

Each battery sub-cluster includes at least one first type battery module and at least one second type battery module. Referring to FIG. 3, for the battery sub-clusters arranged in a matrix, battery modules in the same row in each battery sub-cluster are of the same type, and battery modules in the same column are of different types. The battery modules in the same row are connected in series one by one, the battery modules in the other row are connected in series one by one, and a battery module at one end of one row is connected in series with an adjacent battery module that is at one end of the other row, such that a ring connection is formed in a battery sub-cluster. All battery sub-clusters are connected in series, such that all battery modules in the battery cluster form a ring connection. Output terminals of the battery modules at both ends of the ring connection that are not connected in series are functioned as a positive electrode and a negative electrode of the battery cluster. For example, a positive electrode of the battery module 1-3#in FIG. 3 is functioned as a positive electrode A of the battery cluster, and a negative electrode of the battery module 1-10#is functioned as a negative electrode B of the battery cluster.

Figure 4:
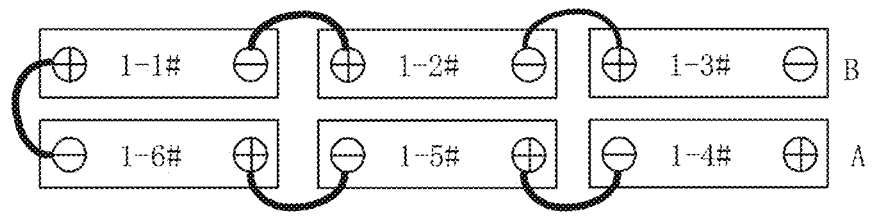
FIG. 4 is a structural schematic diagram of a battery cluster according to an example of the present disclosure.

In the example shown in FIG. 3, in each battery sub-cluster, the first type battery modules are located above the second type battery modules. Alternatively, the first type battery modules may also be located under the second type battery modules, which are shown in FIG. 4. The specific connection mode, matrix arrangement, etc. of the example shown in FIG. 4 may be implemented with reference to the aforementioned examples, which will not be repeated herein.

When the battery cluster is divided into multiple battery sub-clusters, the multiple battery sub-clusters can also be divided into first type battery sub-clusters and second type battery sub-clusters according to different types of battery modules included in the battery sub-clusters. A first type battery sub-cluster is a battery sub-cluster where the first type battery modules are located above the second type battery modules, referring to the example shown in FIG. 2. A second type battery sub-cluster is a battery sub-cluster where the first type battery modules are located below the second type battery modules, referring to the example shown in FIG. 4.

Multiple implementations of a battery cluster according to the battery sub-clusters included thereof are provided in the following.

Figure 5:
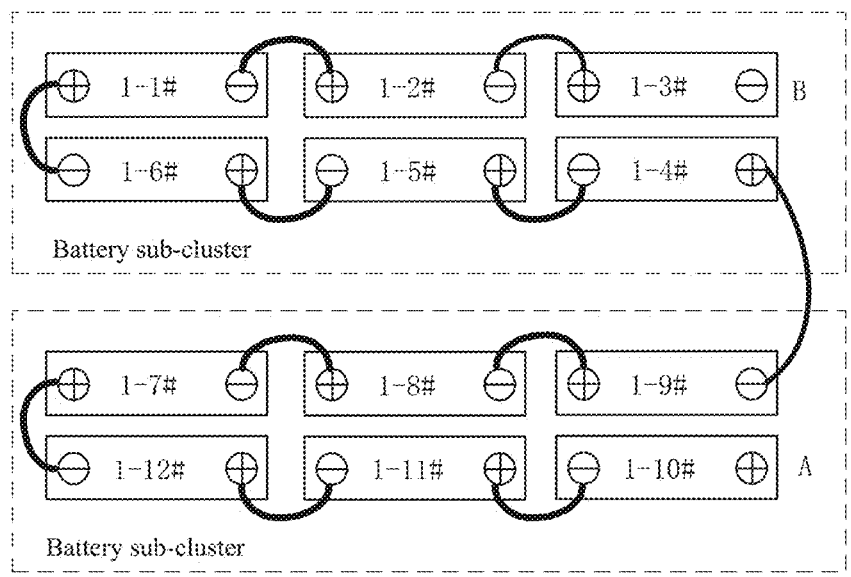
FIG. 5 is a structural schematic diagram of a battery cluster according to an example of the present disclosure.
Figure 6:
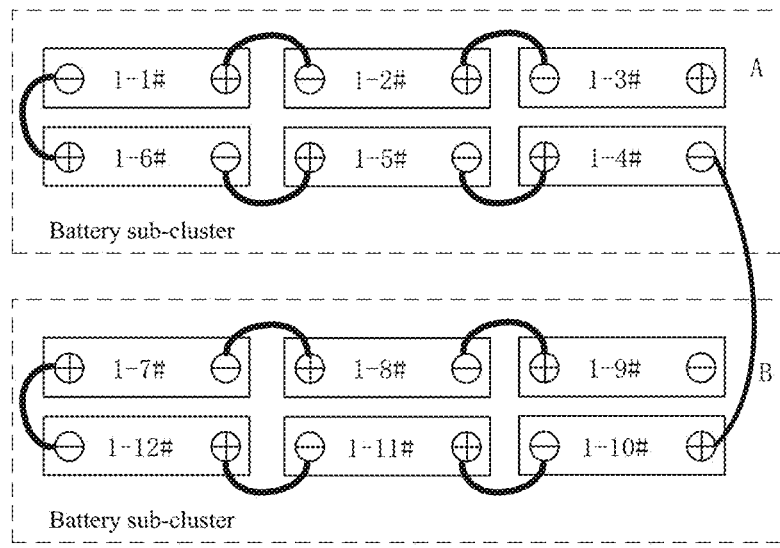
FIG. 6 is a structural schematic diagram of a battery cluster according to an example of the present disclosure.

As shown in FIG. 3, the battery cluster provided in this example includes at least one first type battery sub-cluster (two first type battery sub-clusters are shown in FIG. 3). The battery cluster provided by the example shown in FIG. 5 includes at least one second type battery sub-cluster (two second type battery sub-clusters are shown in FIG. 5). The battery cluster provided by the example shown in FIG. 6 includes at least one first type battery sub-cluster and at least one second type battery sub-cluster.

Figure 7:
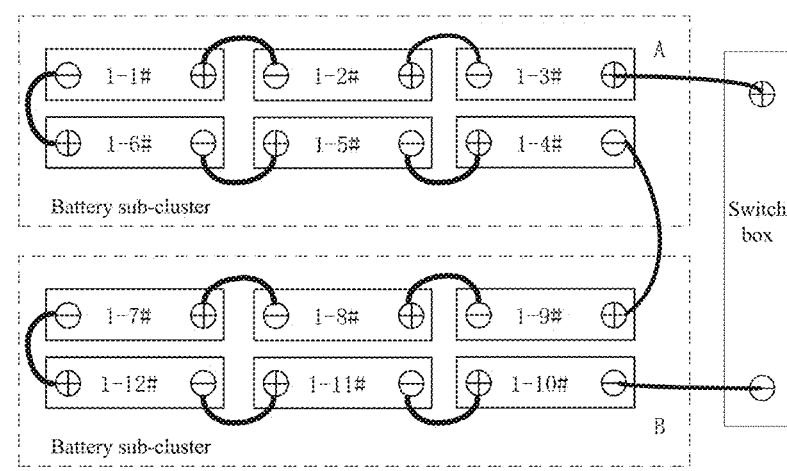
FIG. 7 is a structural schematic diagram of a battery cluster according to an example of the present disclosure.

Reference is made to FIG. 7, which is a structural schematic diagram of a battery cluster according to an example of the present disclosure. The battery cluster in this example is integrated with a switch box. A positive electrode of the battery cluster formed after connecting the battery modules is connected with a positive electrode of the switch box, and a negative electrode of the battery cluster formed after connecting the battery modules is connected with a negative electrode of the switch box. The battery clusters are connected to the switch box, and then connected to a downstream device.

The example shown in FIG. 7 is based on the battery sub-cluster of FIG. 3. In practical applications, the battery cluster provided by any of the aforementioned examples of the present disclosure may be integrated with a switch box, which will not be described again herein.

When the battery cluster is divided into multiple battery sub-clusters, the multiple battery sub-clusters are connected in series one by one, and then connected to a junction box. In order to facilitate wiring, the battery sub-clusters are arranged in a row, and two ends of each battery sub-cluster are located on the same side of the junction box, and the detailed arrangement is shown in FIG. 7.

Figure 8:
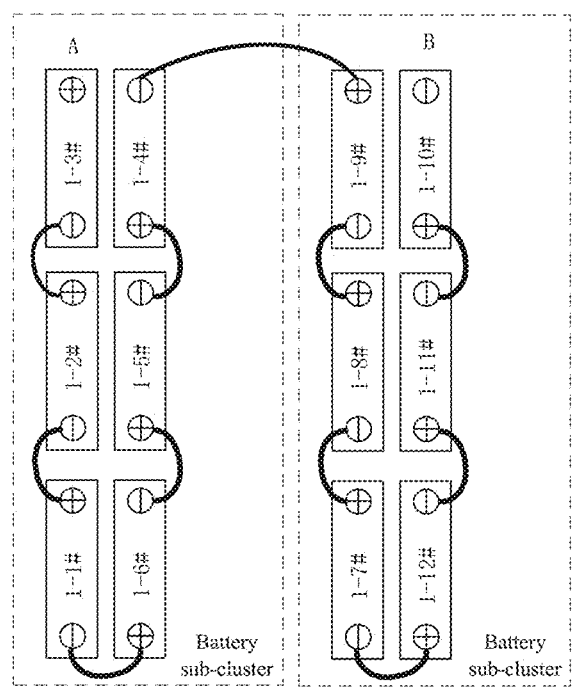
FIG. 8 is a structural schematic diagram of a battery cluster according to an example of the present disclosure.

It can be seen from the examples of FIGS. 2-7 that the battery modules in each example are arranged horizontally. And the battery modules may also be arranged longitudinally if the installation space and installation structure are suitable. Reference is made to FIG. 8, which is a structural schematic diagram of a battery cluster according to an example of the present disclosure, in which the battery modules are arranged longitudinally.

The battery modules in the battery cluster may also be arranged obliquely at a preset angle. A specific tilt angle may be selected according to the space of the application site and the difficulty of wiring without affecting the normal operation of the battery modules, which will not be described in detailed herein.

It should be noted that, in the above examples, the number of battery modules included in each battery sub-cluster is the same, and they are all even numbers, such that the battery cluster is more standardized and convenient to connect, and output parameters of the battery cluster may be set the same. However, in practical applications, the number of battery sub-clusters is not limited, and each battery sub-cluster in the same battery cluster may include different numbers of battery modules, or an odd number of battery modules (in this case, the number of the first type battery modules is different to that of the second type battery modules). These settings can be flexibly selected according to specific application scenarios, which all fall within the scope of the present disclosure without exceeding the core principle of the present disclosure.

An energy storage system is provided according to an example of the present disclosure. The energy storage system includes a convergence device and at least one battery cluster according to any one of the aforementioned examples, where each battery cluster is respectively connected to the convergence device, and the convergence device is connected to a lower-level equipment.

The energy storage system provided by the present disclosure will be described in detail hereinafter in conjunction with specific examples.

Figure 9:
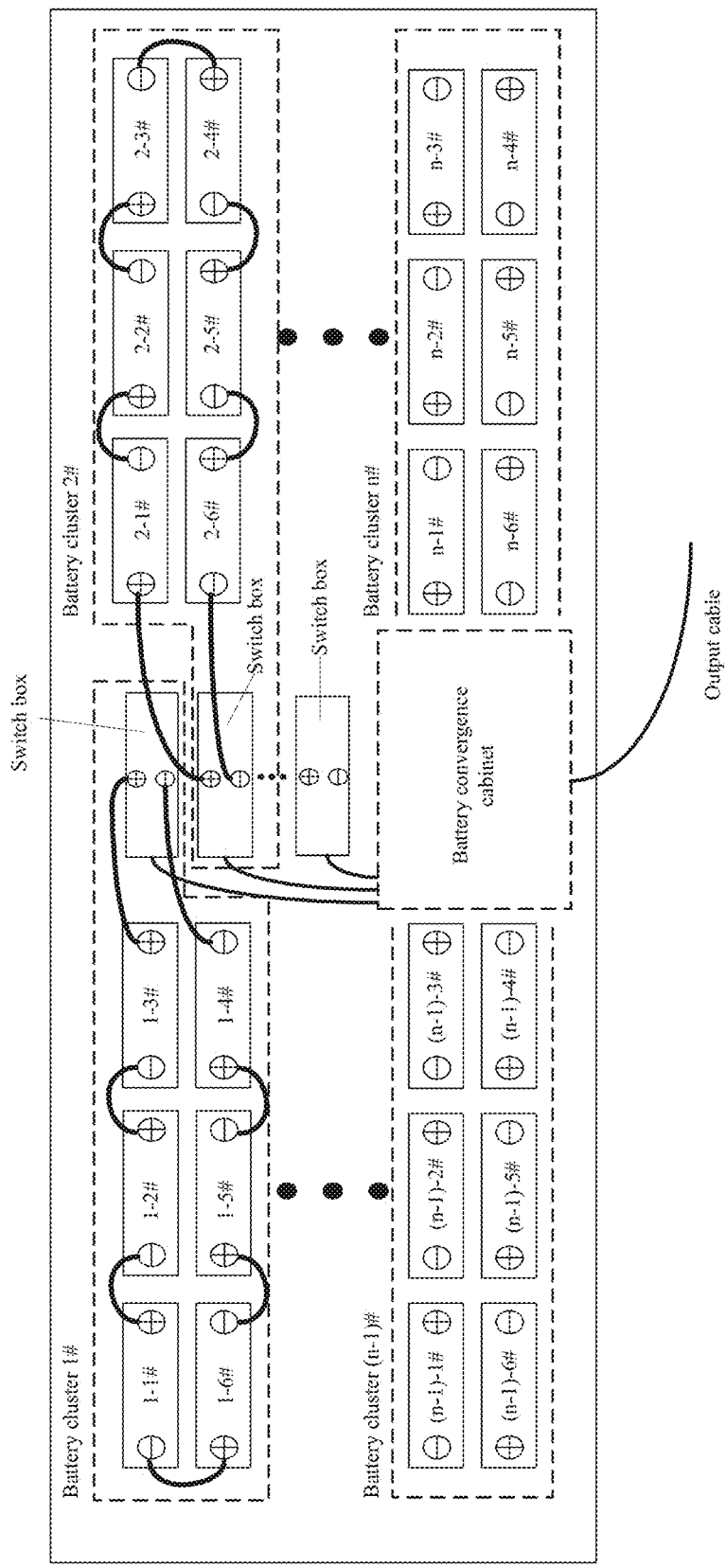
FIG. 9 is a structural block diagram of an energy storage system according to an example of the present disclosure.

Reference is made to FIG. 9, which is a structural schematic diagram of an energy storage system provided by an example of the present disclosure. In this example, each battery cluster is integrated with a switch box, and the convergence device is a battery convergence cabinet. Battery clusters are arranged on both sides of the battery convergence cabinet, so that a wiring distance from each battery cluster to the battery convergence cabinet is or almost the same.

Figure 10:
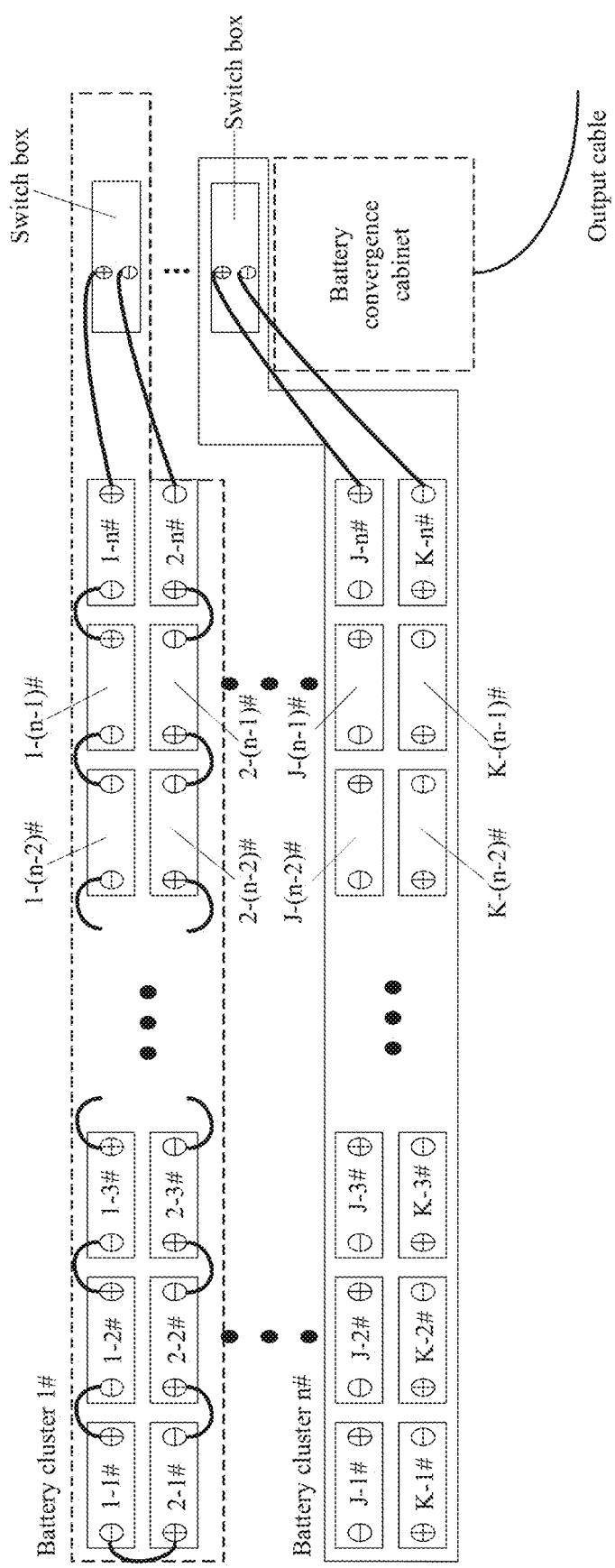
FIG. 10 is a structural block diagram of an energy storage system according to an example of the present disclosure.

Reference is made to FIG. 10, which is a structural schematic diagram of an energy storage system provided by an example of the present disclosure. In the example of FIG. 10, each battery cluster includes a switch box, and all battery clusters are arranged on one side of the battery convergence cabinet.

In conclusion, the battery cluster provided by the examples of the present disclosure may be integrated with a switch box, or may not include a switch box, and accordingly, the specific structure of the convergence device in the energy storage system may also be different. In the examples of FIGS. 9 and 10, the convergence device is realized by a battery convergence cabinet. In practical applications, for a battery cluster that does not include a switch box, there are many options for the convergence device connected to it.

In an example, in a case that the battery cluster does not include a switch box, the convergence device includes at least one switch box and a battery convergence cabinet. Each battery cluster is respectively connected to a corresponding switch box. Each switch box is respectively connected to the battery convergence cabinet. The battery convergence cabinet is connected to a lower-level equipment.

In an example, in a case that the battery cluster does not include a switch box, the convergence device includes a power converter that is integrated with a switch box function and a current convergence function In an example, in a case that the battery cluster does not include a switch box, the convergence device includes a power converter that is integrated with a switch box function.

The arrangement of the convergence device in any configuration and battery clusters may be implemented with reference to the examples shown in FIG. 9 or FIG. 10, which will not be described again herein.

In an example, the power converter in the aforementioned convergence device may specifically be a direct current to direct current (DC-DC) converter, a direct current to alternating current (DC-AC) converter, or a DC-AC converter integrated with a DC-DC function.

In an example, the energy storage system according to any of the aforementioned examples may adopt an air cooling system or a liquid cooling system.

In practical applications, the operating time of a fuse in the switch box is obviously affected by a parasitic inductance of a short-circuit loop. The greater the parasitic inductance, the longer it takes for the fuse to realize the process of short circuit and arc extinguishing. The size of the parasitic inductance depends on the area enclosed by the short-circuit loop. The larger the area enclosed by the short-circuit loop, the greater the parasitic inductance is, which is not conducive to the short-circuit protection of the fuse in the switch box.

In the battery cluster and energy storage system according to any of the aforementioned examples of the present disclosure, the battery modules are connected in series to form a ring connection, such that the area enclosed by the DC short-circuit loop is reduced, thereby reducing the loop parasitic inductance and improving the short-circuit protection effect of the fuse. In addition, the battery cluster is spatially separated from other electrical devices, thereby reducing the risk of damaging the battery cell due to electrical failures.

The examples in this specification are described in a progressive manner. For the same or similar parts between the examples, one may refer to the description of other examples. Each embodiment lays emphasis on differences from other embodiments. Since the system embodiment is similar to the method embodiment, the description for the system embodiment is relatively simple. For related parts, reference may be made to description in the method embodiment.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application; such implementation should not be considered to be beyond the scope of the present disclosure.

The steps of the method or algorithm described according to the embodiments disclosed herein can be implemented in forms of hardware, a software module executed by a processor or the combination of the both. The software module may be stored in a Random Access Memory (RAM), a memory, a Read-Only Memory (ROM), an electrically programmable ROM, an electrically erasable programmable ROM, a register, a hardware disk, a movable magnetic disk, CD-ROM or any other forms of storage medium well known in the art.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A battery cluster, configured to connected to a switch box, comprising a plurality of battery modules, wherein
　all of the plurality of battery modules are arranged in even rows, each of the plurality of battery modules is arranged horizontally, the plurality of battery modules comprises one first battery module, one second battery module and remaining a plurality of third battery modules, and each of the plurality of battery modules comprises a positive electrode of said battery module and a negative electrode of said battery module;
　each of the plurality of battery modules is connected in series with an adjacent battery module one by one to form a ring connection through a negative electrode of the first battery module, positive electrodes and negative electrodes of the plurality of third battery modules and a positive electrode of the second battery module, a positive electrode of the first battery module is functioned as a positive electrode of the battery cluster, and a negative electrode of the second battery module is functioned as a negative electrode of the battery cluster;
　each two adjacent rows of battery modules are defined as one battery sub-cluster, and the battery cluster is divided into at least one battery sub-cluster;
　battery modules in each of the at least one battery sub-cluster are arranged in a matrix of 2 rows and N columns, where N is an integer number greater than or equal to one;
　the battery sub-cluster comprises at least one first type battery module and at least one second type battery module, a polarity of the first type battery module being opposite to a polarity of the second type battery module;
　battery modules in a same row in a battery sub-cluster are of a same type, and battery modules in a same column in the battery sub-cluster are of different types;
　after the battery modules in the same row in the battery sub-cluster are connected in series one by one, said battery modules in the same row are connected in series with battery modules in another row; and
　in a case that the number of battery sub-clusters is larger than one, the battery sub-clusters are connected in series one by one.

2. The battery cluster according to claim 1, wherein the first type battery module is arranged above the second type battery module.

3. The battery cluster according to claim 1, wherein the first type battery module is arranged under the second type battery module.

4. The battery cluster according to claim 1, further comprising at least one first type battery sub-cluster and at least one second battery sub-cluster, wherein
　in the first type battery sub-cluster, the first type battery module is arranged above the second type battery module; and
　in the second type battery sub-cluster, the first type battery module is arranged under the second type battery module.

5. The battery cluster according to claim 1, further comprising at least one first type battery sub-cluster or at least one second battery sub-cluster, wherein
　in the first type battery sub-cluster, the first type battery module is arranged above the second type battery module; and
　in the second type battery sub-cluster, the first type battery module is arranged under the second type battery module.

6. The battery cluster according to claim 1, wherein in a case that the number of battery sub-clusters is larger than one, the number of battery modules in each battery sub-cluster is the same.

7. The battery cluster according to claim 1, further comprising a junction box, wherein
　in a case that the number of battery sub-clusters is larger than one, after the battery sub-clusters are connected in series one by one, the battery sub-clusters are connected to the junction box; and
　the battery sub-clusters are arranged in one column, and two ends of each of the battery sub-clusters are arranged on one side of the junction box.

8. An energy storage system, comprising a convergence device, a switch box and a battery cluster, the battery cluster is configured to connected to the switch box and comprises a plurality of battery modules, wherein
　all of the plurality of battery modules are arranged in even rows, each of the plurality of battery modules is arranged horizontally, the plurality of battery modules comprises one first battery module, one second battery module and remaining a plurality of third battery modules, and each of the plurality of battery modules comprises a positive electrode of said battery module and a negative electrode of said battery module;
　each of the plurality of battery modules is connected in series with an adjacent battery module one by one to form a ring connection through a negative electrode of the first battery module, positive electrodes and negative electrodes of the plurality of third battery modules and a positive electrode of the second battery module, a positive electrode of the first battery module is functioned as a positive electrode of the battery cluster, and a negative electrode of the second battery module is functioned as a negative electrode of the battery cluster;
　each two adjacent rows of battery modules are defined as one battery sub-cluster, and the battery cluster is divided into at least one battery sub-cluster;
　battery modules in each of the at least one battery sub-cluster are arranged in a matrix of 2 rows and N columns, where N is an integer number greater than or equal to one;
　the battery sub-cluster comprises at least one first type battery module and at least one second type battery module, a polarity of the first type battery module being opposite to a polarity of the second type battery module;

battery modules in a same row in a battery sub-cluster are of a same type, and battery modules in a same column in the battery sub-cluster are of different types;

after the battery modules in the same row in the battery sub-cluster are connected in series one by one, said battery modules in the same row are connected in series with battery modules in another row;

in a case that the number of battery sub-clusters is larger than one, the battery sub-clusters are connected in series one by one; and the battery cluster is connected with the convergence device respectively, and the convergence device is connected with a lower-level equipment.

9. The energy storage system according to claim 8, wherein the battery cluster is arranged on one side of the convergence device.

10. The energy storage system according to claim 8, wherein in a case that the number of battery clusters is larger than one, said battery clusters are arranged on two sides of the convergence device.

11. The energy storage system according to claim 8, wherein the battery cluster comprises the switch box, the convergence device comprises a battery convergence cabinet, and switch boxes of the battery cluster are respectively connected with the battery convergence cabinet.

12. The energy storage system according to claim 8, wherein the convergence device comprises the switch box and a battery convergence cabinet, the battery cluster is connected with a corresponding switch box respectively, the corresponding switch box is connected with the battery convergence cabinet, and the battery convergence cabinet is connected with a lower-level equipment.

13. The energy storage system according to claim 8, wherein the convergence device further comprises a power converter integrated with a switch box function and a current convergence function.

14. The energy storage system according to claim 8, wherein the convergence device comprises a power converter integrated with a switch box function.

* * * * *